March 16, 1965        R. LOOKER        3,173,539

CARGO SECURING ARRANGEMENT

Filed Oct. 30, 1961        6 Sheets—Sheet 1

INVENTOR:
Robert Looker
Attorneys

March 16, 1965 R. LOOKER 3,173,539
CARGO SECURING ARRANGEMENT
Filed Oct. 30, 1961 6 Sheets-Sheet 2
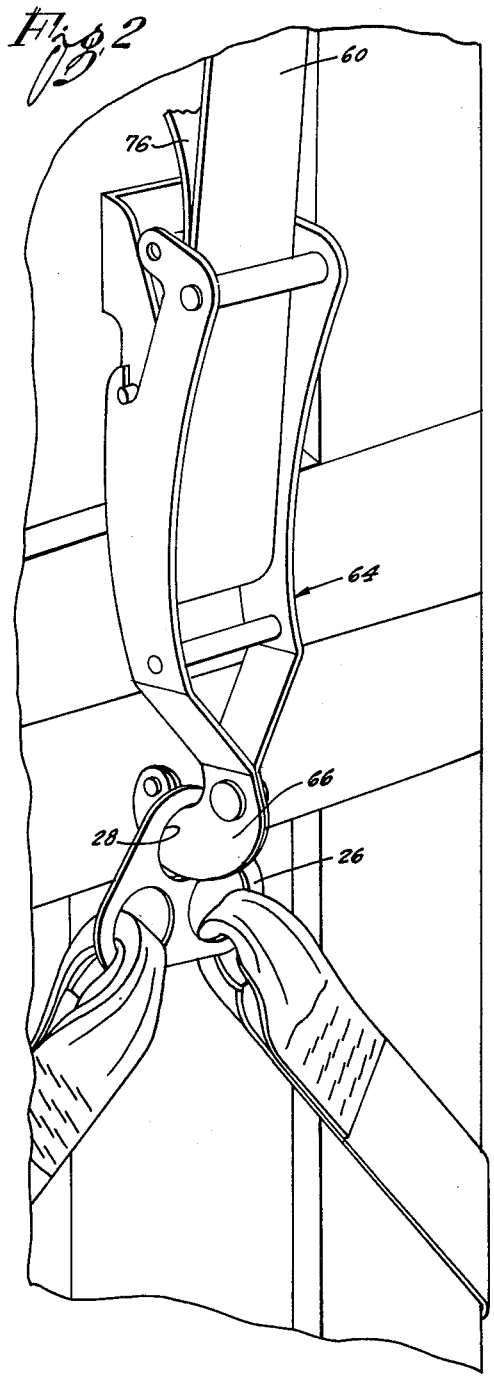
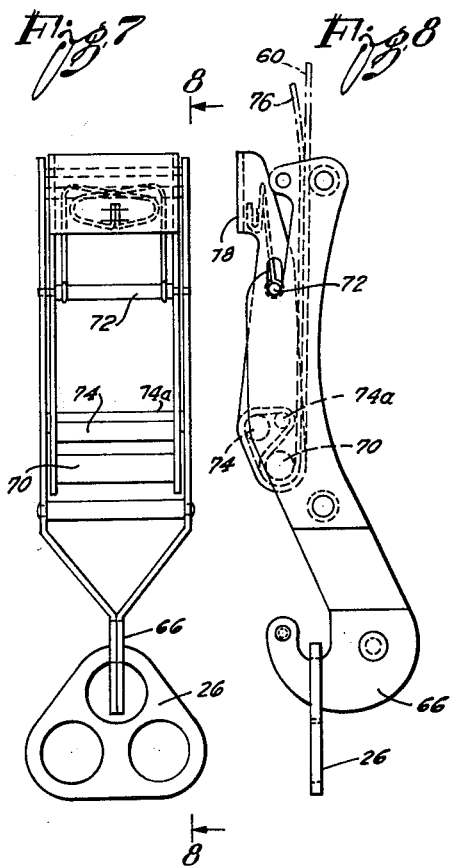
INVENTOR:
Robert Looker
Attorneys

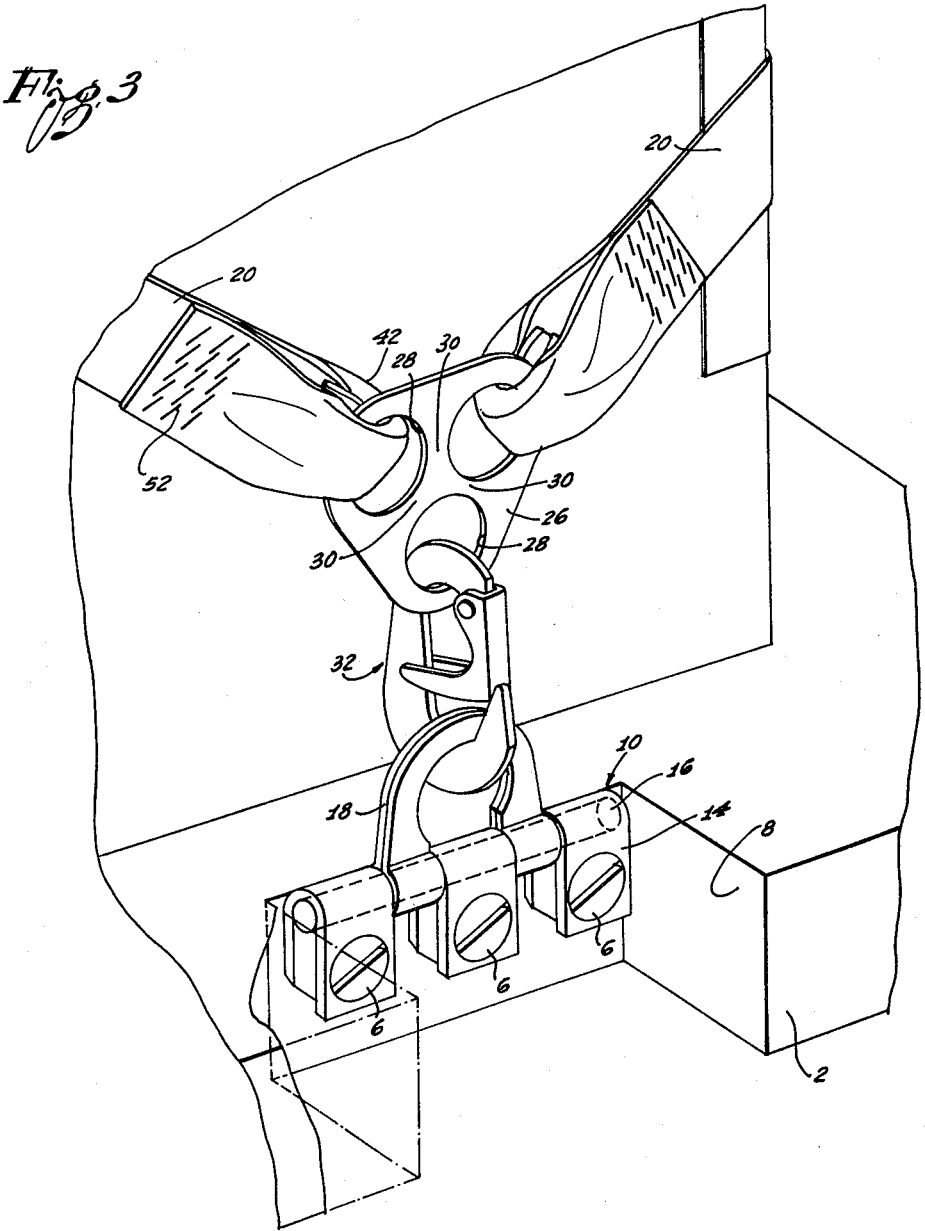

March 16, 1965 R. LOOKER 3,173,539
CARGO SECURING ARRANGEMENT
Filed Oct. 30, 1961 6 Sheets-Sheet 4
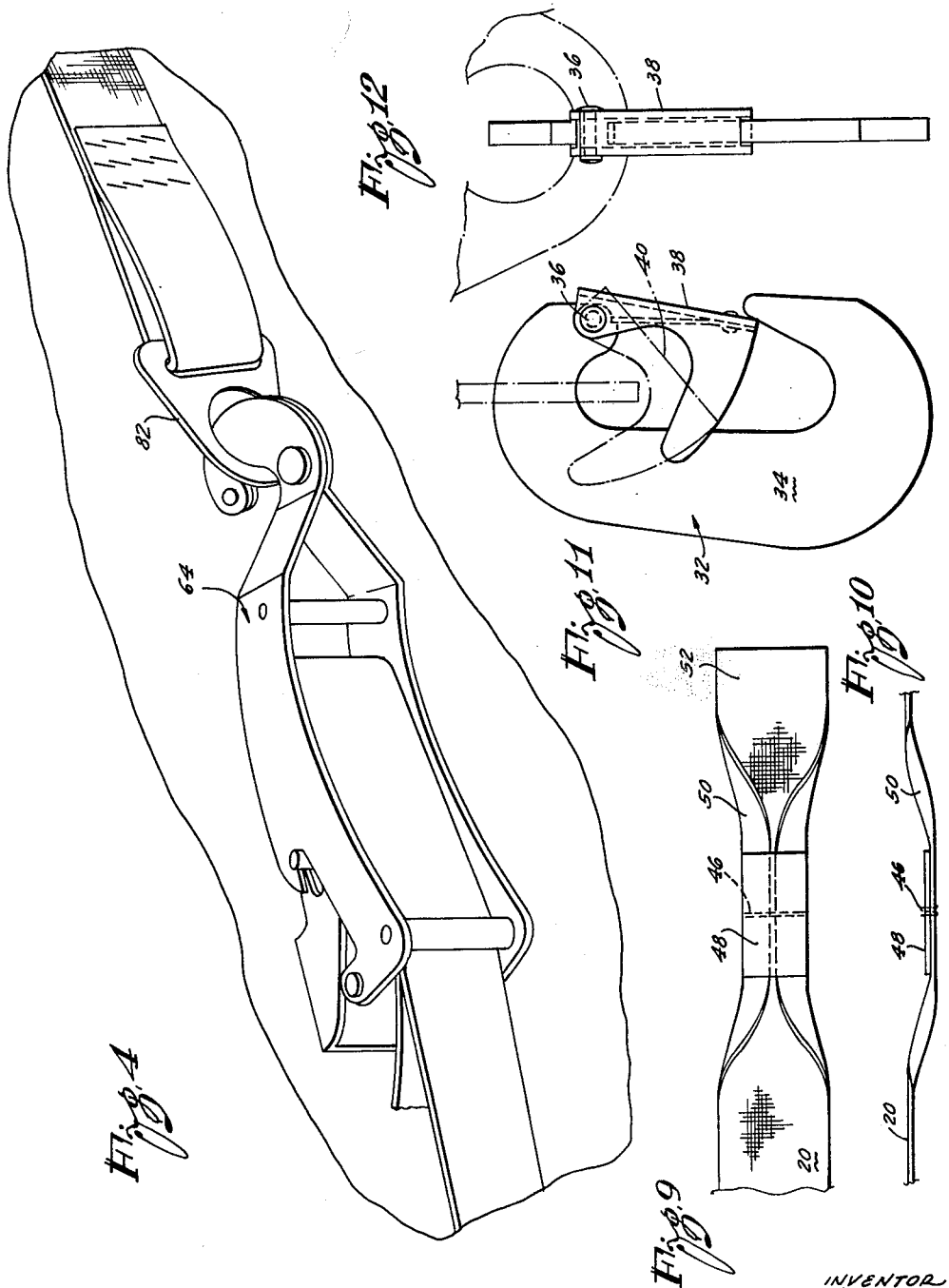

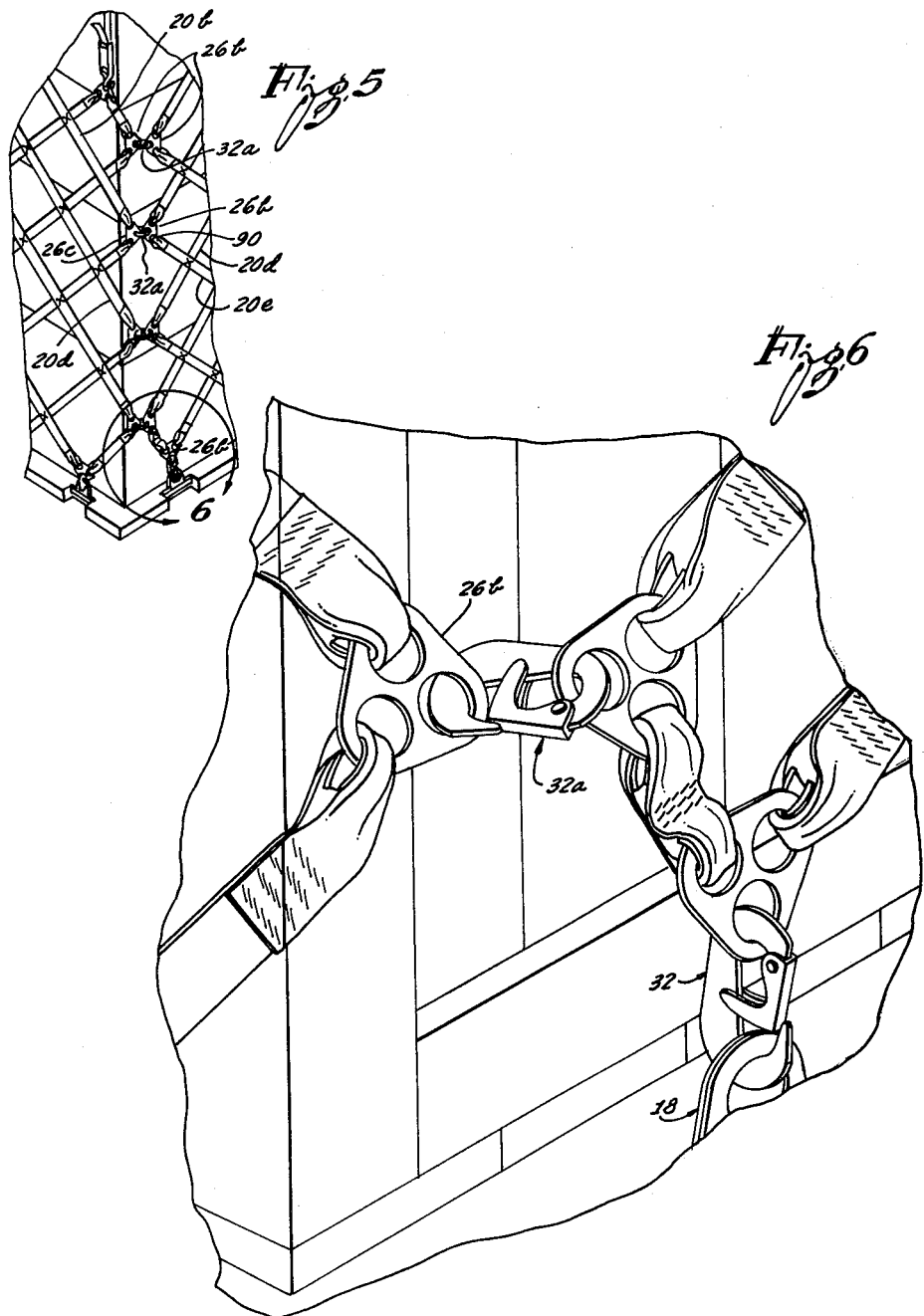

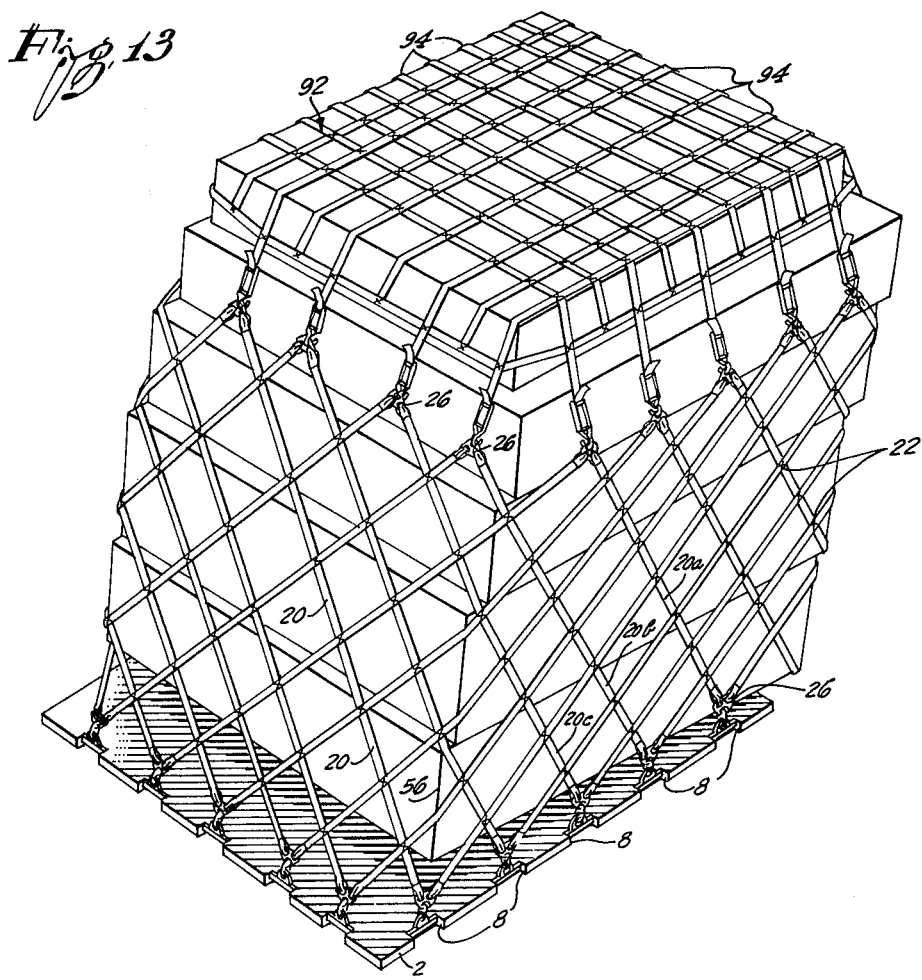

United States Patent Office 3,173,539
Patented Mar. 16, 1965

3,173,539
CARGO SECURING ARRANGEMENT
Robert Looker, Santa Monica, Calif., assignor to Brown-Line Corporation, El Segundo, Calif., a corporation of California
Filed Oct. 30, 1961, Ser. No. 148,663
10 Claims. (Cl. 206—65)

The invention generally relates to cargo securing and has particular reference to a unique web arrangement having utility in the pallet packaging and hauling of freight by aircraft.

Historically, the transport of freight by air was early considered uneconomical and its use was limited to those circumstances where considerations of elapsed time far outweighed transport cost consideration. Increased freight volume and improved airframe design have, however, narrowed the cost gap between air freight and the more conventional modes of transport.

Air freight costs are largely controlled by three independent factors, namely, total weight, total volume, and equipment use time. The latter constitutes as a general proposition, flying time per unit of elapsed time. It has been learned through experience that ancillary economic criteria such as original investment inequipmentandequip equipment maintenance cost per unit of service time tends to increasingly emphasize the controlling nature of equipment use time as against weight and volume considerations. With this in mind, attention has been given to reduction in equipment down or non use time incident to freight loading and unloading operations. This inquiry has resulted in efforts to standardize, within reasonable limits, cargo "packages" that may be preassembled for the haul and then quickly loaded or unloaded from the plane.

Any solution along these lines, however, must of necessity be subject to the particular requirements for the air haul. For example, the cargo must be so mounted in the aircraft that it will not shift position under variable load conditions that may be encountered in aircraft operation. The extreme condition is, of course, the crash landing condition wherein cargo shifting due to its inertia of motion and craft deceleration temporarily exerts on the cargo forces up to eight times the force of gravity with current air freight equipment. Obviously, if the cargo is not appropriately restrained, it would shift and most probably injure or destroy the entire air crew who are generally positioned forward of the cargo storage area.

Accordingly, it is a feature of the disclosed invention to offer an improved mode of securing cargo particularly useful in air transport. The invention further comprehends a unique net arrangement in combination with standard cargo supporting pallets which effectively secures the cargo multidirectionally under all haul load conditions. It will be understood, of course, that in the air haul the pallets are appropriately secured to the fuselage or floor structure of the aircraft by suitable means which are not, per se, part of the disclosed invention. The disclosed invention also improves compactness of the lashed cargo. This is accomplished by virtue of the fact that the net automatically provides uniform corner pressure concentration to firmly retain the cargo and accommodate even stress distribution under normal load conditions. An additional important feature is provided in that the net structure itself automatically adjusts to varying size loads, thus improving the useful efficiency of the arrangement. The herein disclosed net arrangement also offers increased net strength without increasing the physical size of the net components by improved load distribution throughout the arrangement. This results not only from net structural design including net flexibility that will accommodate webbing elongation, but also from the mode of interconnecting segments of the webbing to substantially improve web articulation and avoid local high stress concentrations and the like which, in prior art devices, were found to be the cause of localized net failure.

Giving brief consideration to an example of extreme load conditions, it could, for simplicity and illustrative purposes, be assumed that an aircraft is traveling at approximately twenty miles per hour and crashes into an abutment which would decelerate the craft in one and one-half feet for a period of time of approximately one-tenth of a second. The situation reasonably could occur on loading with a braking failure for example. If we assume 10,000 pounds of cargo to be restrained by the net during the illustrative crash condition, it will be apparent that the net must restrain a dynamic force in excess of eight times the force of gravity, i.e., eight times 10,000 pounds or 80,000 pounds. As a result of the novel structure of the herein disclosed webbing net arrangement and particularly the equal effective stringer lengths, high degree of universal articulation at points of juncture and the characteristic that each stringer will elongate under load before failure, it will be understood that the mentioned 10,000 pounds of cargo would move in deceleration approximately three feet due to the evenly distributed elastic deformation of the stringer under the evenly distributed load stress. The effective deceleration time would therefore be approximately two tenths of a second and the force to be restrained only four times gravity or 40,000 pounds.

In addition to the above, the herein disclosed arrangement is initially more economical and offers easier and more efficient loading and unloading than that of the aforementioned prior art arrangements.

All of the above features and more are afforded by the invention and desirably, the arrangement is lighter in weight because of its ability to more effectively lash and restrain cargo and further due to the elimination of the substantial number of mechanical webbing buckle devices that were required to be used in the prior art nets.

These and other features of the invention will become apparent in the course of the following description and from a examination of the associated drawings, wherein:

FIGURE 2 is a detail view taken at the circle 2 of FIGURE 1;

FIGURE 3 is a fragmentary detail view taken at the circle 3 of FIGURE 1;

FIGURE 4 is a fragmentary detail taken at the circle 4 of FIGURE 1;

FIGURE 5 is a fragmentary perspective view of one corner of an assembled pallet and web-lashed cargo in a modification of the invention;

FIGURE 6 is a fragmentary perspective view taken at the circle 6 of FIGURE 5;

FIGURE 7 is a plan view of one variable buckle arrangement employed in the invention;

FIGURE 8 is an elevational view taken along line 8—8 of FIGURE 7;

FIGURE 9 is a detail view, before assembly, of a typical webbing formation for use in a webbing connection;

FIGURE 10 is a side elevational view of the structure shown in FIGURE 9;

FIGURE 11 is a side elevational view of yet another hook arrangement that may be employed in the invention;

FIGURE 12 is an end elevational view of the structure shown in FIGURE 11; and

FIGURE 13 is a typical illustration of the arrangement functioning to restrain cargo under unusual or crash loading conditions.

Figure 1:
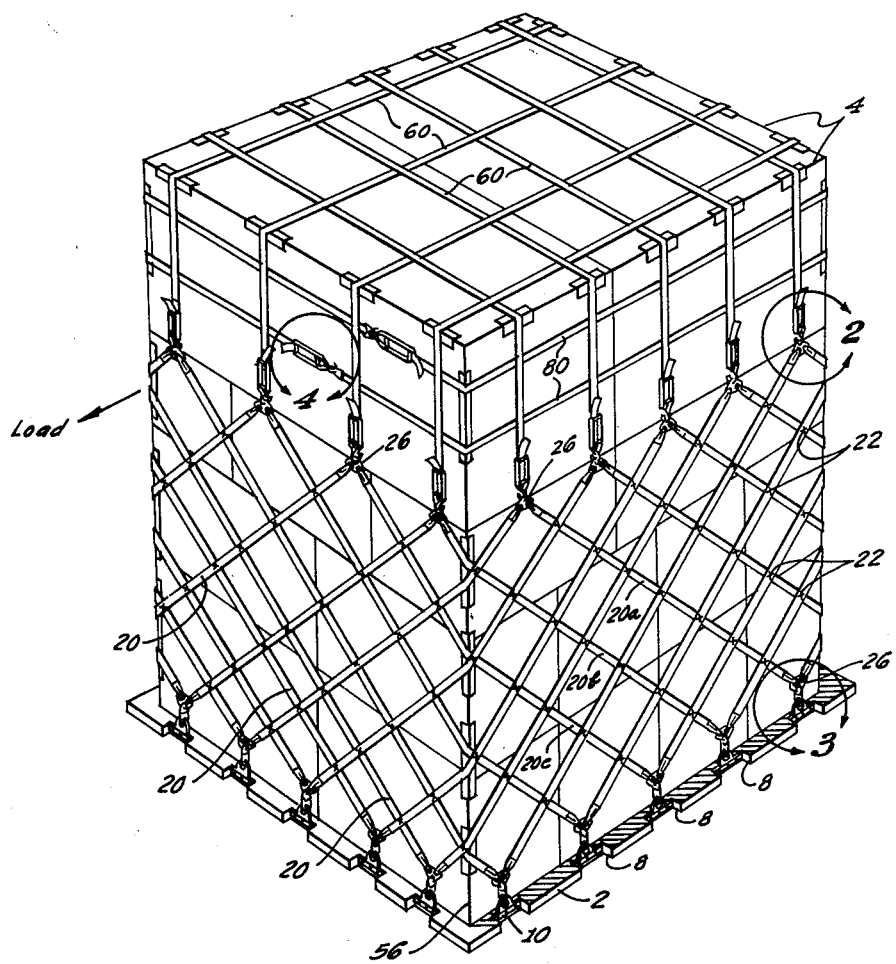
FIGURE 1 is a perspective view of the disclosed net arrangement in the assembled condition with a pallet carried cargo.

Describing the invention in detail and directing attention initially to FIGURE 1, it will be understood that in air cargo hauling, as contemplated by the disclosed arrangement, a pallet 2 is provided, said pallet being a conventional, generally flat supporting member on which may be placed a plurality of containers 4 which form the cargo to be carried. In the usual circumstance, the pallets 2 are rectangular in form, however, the herein disclosed invention may be utilized with other geometric configurations. Considering FIGURES 1 and 3, it will be noted that each pallet 2 is provided with an appropriate connection means 10, each of which may be bolt mounted as at 6 within a slot 8 formed in the peripheral edge of the pallet. It will be understood, however, that certain pallet designs do not employ slot mounting of connector means. Each connection means 10 comprises a fixed element 14 hingingly carrying via pin 16 a half-ring connector 18. It will be noted that the connection elements are peripherally disposed around the pallet 2 and preferably equally spaced from each other.

The cargo lashing net comprises a plurality of elongated stringers 20, 20 arranged in net form and diagonally projecting relative to the plane of the pallet 2. With this physical arrangement, the stringers 20 overlap each other as at 22, 22 to form a generally diamond pattern around the cargo boxes 4 and as seen in elevational view. In the preferred embodiment, the stringers 20 are secured to each other at their overlapping points 22, such securing being accomplished by an appropriate sewn thread which effectively ties the stringers together yet accommodates stringer flexibility.

Returning to FIGURE 3, it will be noted that an important feature of the invention is the connecting plate 26. The plate 26 comprises a relatively thin metallic plate preferably of triangular configuration and having a plurality of holes 28 formed therein. It will be noted that the holes 28 may be punched in the plate 26 immediately adjacent the points of the triangle whereby ribs 30 are defined by interconnecting the sides of the triangle.

The importance of this particular connecting element relates to the fact that the desirable function of the webbing arrangement requires a high degree of universal articulation at the points of connection. Additionally, weight considerations require that the connecting element 26 be as light as possible. Still another factor requires that the connecting element must be of such inherent strength that it will not fracture during the stresses which could possibly occur incident to the hauling operation including crash landing conditions. Giving appropriate weight to all of these considerations, it has been found that the relatively thin metallic plate having holes 28 therein satisfies the requirement of light weight, inherent strength, and offers the degree of connection articulation which will accommodate, in combination with the connection structure hereinafter described, appropriate and even stress distribution throughout the entire arrangement, thereby avoiding localized failure of the webbing or connection element and additionally insuring appropriate compactness in the original cargo lashing.

To provide the webbing connection to the pallet, it will be noted that a hole 28 in the connection plate 26 receives a hook 32 which is also received within the hole of the half ring 18. Turning to FIGURE 11, it will be noted that the hook 32 comprises the C-shaped plate 34 having a pin 36 at one point of the C which pivotally mounts a retainer link 38. A spring 40 is compressively interposed between the C clamp 32 and the retainer 38 to normally bias the retainer to a closed position in engagement with the opposed point of the C. Thus, as seen in FIGURE 3, the clamp 32 having one end received within aperture 28 of the connecting plate 26 has its other end connected to the element 18 whereby the plate 26 is flexibly secured to the pallet 2.

To provide connection between the plate 26 and the flexible stringers 20, it will be noted that the stringers have a loop 42 formed on the adjacent end thereof. Turning to FIGURES 9 and 10, it will be noted that each stringer 20 in the preferred embodiment, has its opposed edges folded inwardly in general alignment with the longitudinal axis of the stringer 20 and to overlie the central portion thereof. Thread means 46 secure the related segment of the stringer 20 in said multiple folded position. Additionally, a flexible pad 48, preferably of material similar to the stringer 20, is thread-mounted to overlie the folded segment 50. Thereafter, the free end 52 of the related stringer 20 is threadably positioned within the related aperture 28 and folded whereby its end portion overlies the main body of the stringer 20. Again, the stringer is thread sewn to secure the overlying portions to each other and form the looped connection 42 to the plate 26. Recalling that the plate 26 is preferably formed of a relatively thin metallic material to meet weight and strength considerations as noted above, it will be understood by those skilled in the art that such a relatively thin section normally would provide a point of relatively high stress concentration at its connection with the stringer 20 which could, and in fact has in prior art arrangements, offered a point of weakest link which resulted in webbing failure. The folding of the segment 50 of the stringer 20 and the association of the pad 48 with the fold has resulted in a substantial increase in the connection strength at this point, thus allowing the use of the thin relatively light connection plate 26. This increased strength at the connection point has been accomplished without important weight increase and has resulted in and contributes to the over all stress equalization throughout the entire net arrangement which is an important feature of the disclosed embodiment as will hereafter appear.

Returning to FIGURE 1, it will be noted that each stringer 20 has its lower end connected to one of the plates 26 and extends diagonally upwardly to a like connection to an upper plate 26. Along the sides of a rectangular pallet 2, certain of these stringer connections are uniformly straight as, for example, at 20a. However, other of the stringer elements, as for example, 20b and 20c have a lower connection to the pallet 2 on one side thereof and extend diagonally upwardly around the pallet corner 56 to upper connections with the upper line of plates 26. It will be understood, however, that the length of the respective flexible stringer elements 20 are substantially equal and that, as a result of the corner passing feature described above, in combination with the uniform stress distribution of the entire net arrangement, there results a substantially uniform corner pressure at all corners of the pallet carried cargo which acts to compress all of the cargo radially inwardly toward the central axis of the carried cargo resulting in an extreme tightly lashed cargo package.

Considering FIGURES 1 and 2, it will be noted that a plurality of tie-in straps 60 are arranged to overlie the cargo and extend downwardly along the sides thereof for appropriate connection to the horizontally aligned upper connection plates 26. A typical connection is shown in FIGURE 2 and comprises a buckle, indicated generally at 64, having a hook 66 on the free end thereof for association with an opening 28 of related plate 26. As noted in FIGURES 7 and 8, the strap 60 is interlaced with the buckle 64 to partially encircle pins 70, 74a and 74 returning to overlie itself and the pin 70 and back out of the buckle 64 to its free end 76. In addition, a locking segment 78 is pivotally connected to the main body of the buckle 64 via pin 72 whereby upon appropriate threading and tensioning of the strap 60, the element 78 may be pivoted into the locked position shown in FIGURE 8 thereby further tensioning and securely fastening the strap 60.

If the load so requires, additional straps 80 may be arranged to horizontally surround the upper portion of the cargo and may be provided with appropriate end connections such as buckles 64 and connector 82 (FIGURE 4) to firmly surround the upper portion of the core. As will hereinafter appear, however, the horizontal straps may be eliminated in certain arrangements where the cargo height is not so great.

Directing attention to FIGURE 5, which fragmentarily illustrates a modification of the net arrangement shown in FIGURE 1, it will be understood that here the net may be sectionalized as shown. For example, certain of the stringers along one vertical edge of the cargo may be arranged to terminate at vertical connecting plates 26b. Thus, the net, instead of being peripherally continuous, may be formed in segments. However, in the assembled cargo lashing position and from the standpoint of stress distribution and pallet loading, it will be understood that the stringers are effectively continuous through the connecting plates 26b and associated cargo clamps 32a. For example, stringer 20e connects as at 90 with plate 26b. A hook element 32a interconnects plate 26b with a related plate 26c on the adjacent portion of the net. The related plate 26c, in turn, is connected to stringer 20b which, in turn, continues upwardly to its point of connection (not shown) to the upper line of connecting elements as in the first embodiment. Thus, one effective continuous flexible stringer is formed via the stringer portion 20e and 20b and the interconnecting plates and clamps. This modified structure has been found to have utility in facilitating loading of certain pallets, again depending upon the size thereof and the relative amount of cargo carried thereon. However, from a functional standpoint, and from the standpoint of effective stress distribution as well as variable loading of variable size pallets, the modified structure functions identically with that above described. It will also be apparent that the net may be further segmented into, for example, two or more segments. It will also be understood that the connection between the stringer and the plates is identical with that described relative to FIGURES 9 and 10.

Directing attention to FIGURE 13, it will be understood that the arrangement here shown illustrates a typical cargo being restrained by the disclosed arrangement under severe loading conditions such as the crash landing condition earlier described. It will be particularly noted that under this condition, the cargo has shifted substantially as shown. The elastic elongation of the respective stringers 20 has accommodated this cargo shift without failure. It will also be readily apparent that the unique articulated connections afforded by the plates 26 and the equal effective length of the respective stringers has permitted even stress distribution substantially throughout the arrangement even though cargo shift has induced considerable change in angular relationship between the various segments of the arrangement.

It will also be noted that an interconnected web net 92 comprising normally related joint connected elements 94 defining equal sized rectangles has been substituted for the tie-in straps disclosed in the earlier described embodiments. In many cargo pallet applications, the use of a net of this type increases the efficiency and rapidity of the pallet loading and unloading operation and aids in maintaining a compact cargo package especially where, for example, the cargo comprises crates or cartons of varying size.

In the structure shown and described, it will be apparent that the netting arrangement offers certain unique advantages. For example, the net may be continuous around the entire periphery of the pallet or may be segmented as describebd immediately above. Structurally, it will also be recalled that certain strap elements begin on one side of the pallet and terminate on another side of the pallet going around the pallet and cargo corners. Thus, when the tie-in straps 60 are secure by tensioning said straps, the effect is to create, automatically, pressure concentrations at the cargo corners to urge same radially inwardly, maintaining a highly compact cargo package.

This feature also accommodates ready adjustment of the net to cargoes varying in size. For example, should a cargo arrangement having smaller load, that is, shorter left, right and front, back dimensions than that illustrated be carried on the pallet 2, a tightening of the tie-in straps 60 will induce the webbing elements 20 to contract inwardly merely raising the points of connection 26. Thus, the net arrangement automatically expands and contracts with changes of the angular relationship of the stringers to accommodate varying load sizes while compactly lashing the cargo. Naturally the angles of divergence of the stringers at the upper and lower connecting plates 26 vary when the net is extended or contracted to accommodate cargos of various width, but the engagement of the looped ends of the stringers with the circular holes 28 of the connecting plates provides articulated joints whereby the stringers align themselves with the tension forces without creating undesirable concentrated stresses by flexural distortion at their anchor ends. The term "articulated" as employed in the appended claims is to be understood as meaning "pivotally connected to avoid local flexural stress." This self-adjusting feature is an important factor in reducing cargo and net erection time in that it eliminates the necessity of additional adjustment and manipulation to insure careful girth tensioning after the net is tightened. Another important feature of the disclosed arrangement is that each flexible stringer 20 is approximately equivalent in effective length to every other stringer 20. As a result of this fact and the combination of plate stringer connection, that arrangement offering the high degree of universal articulation mentioned above, all of the stringers are substantially uniformly stressed, contributing not only to initial package compactness and multidirectional lashing, but also avoiding failure under stress conditions such as crash landing because even the high stress condition is distributed more evenly throughout the net arrangement. This avoids a high stress concentration in, for example, a stringer having a shorter length than the others as in prior art arrangements which resulted in individual webbing failure. In addition to the above advantages, this feature also enables the net to be manufactured from a lighter and less costly webbing.

The invention as shown is by way of illustration and not limitation and may be subject to various modifications without departing from the scope of the appended claims.

I claim:

1. In a cargo securing arrangement for use in combination with a generally rectangular cargo supporting pallet, said pallet having a plurality of lower connecting members arranged in a plane and peripherally secured to the pallet, the combination of a plurality of upper connecting members arranged to extend around the girth of the cargo in a plane generally parallel to the first mentioned plane and spaced thereabove, a net to enclose the four sides of the cargo, said net being formed by a plurality of diagonally arranged flexixble stringers of substantially equal effective length interconnecting the upper and lower connecting members, each of said connecting members having a pair of stringers in angular relation to each other, and tie-in straps to extend over the top of the cargo, said tie-in straps interconnecting the upper connecting members.

2. In a cargo securing net in combination with a cargo supporting pallet having four sides, a first series of spaced connection members peripherally distributed around the four sides of the pallet, a plurality of elongated linearly deformable cargo confining elements each having one end secured to a connection member, each connection member having a pair of elements connected thereto, each pair of flexible elements extending continuously upwardly and in diverging relation to each other whereby all of said elements overlap to form a net of multi-diamond shaped pattern surrounding the cargo, a second series of spaced connection members distributed peripherally around the four sides of the pallet carried cargo and above the first mentioned connection members, each of said last mentioned members having connected thereto a pair of said elements on the ends thereof opposite the mentioned ends, the elements of said second mentioned pair being in diverging relation to each other, and tie-in means extending across the top of the cargo and interconnecting said second connection members to tension said flexible elements and firmly confine said pallet supported cargo, said tie-in means being a plurality of straps, each with its opposite ends connected to connection members of said second series of connection members.

3. A cargo securing net according to claim 2, wherein said tie-in means comprises a webbed net having a plurality of straps overlapping at intermediate points thereof and secured to each other at the points of overlap, said webbed net being tensionally connected to said second connection members.

4. In a cargo securing net for use with a pallet supporting the cargo, the combination of first spaced connection means peripherally arranged on the pallet, second spaced connection means in a plane above and generally aligned with said first connection means, flexible cargo confining elements arranged diagonally as seen in elevational view, each of said elements interconnecting certain of said first and second connection means whereby two diverging elements are associated with each connection means, and variable tie means overlying the top of the cargo to provide tensioned interconnection between said second connection means to place said confining elements under tension.

5. A cargo securing net according to claim 4, wherein each of said connector means comprises a flat plate having a plurality of holes with arcuate rims therein.

6. A cargo securing net according to claim 5, wherein the related end of each element is connected to one of said holes in said plate, said last mentioned connection comprising a loop in the element formed by overlapping the element end and securing the end to the element, said loop being threaded through said one hole, said loop further comprising the permanent longitudinally folding of the element on itself.

7. A cargo securing net according to claim 6, and including a flexible pad secured to the loop and interposed between the loop and the plate.

8. A cargo securing net according to claim 7, wherein said permanent longitudinal folding of the element on itself comprises the folding of opposed parallel edges of the flexible element.

9. Means to secure a cargo to a pallet comprising:
a first plurality of lower connectors spaced around the periphery of the pallet, each formed with at least one aperture with an arcuate edge;
a second upper plurality of connectors spaced around the cargo below the top of the cargo, each formed with at least one aperture with an arcuate edge;
a first set of flexible straps inclined in one direction around the cargo with the lower ends of the straps connected to the lower connectors and the upper ends connected to the upper connectors;
a second set of flexible straps inclined in the opposite direction around the cargo with the lower ends of the straps connected to the lower connectors and with the upper ends connected to the upper connectors; and
additional means extending across the top of the cargo and interconnecting connectors of said second plurality of upper connectors on opposite sides of the cargo, said additional means being adjustable to place said two sets of straps under tension to accommodate different cargo heights, said two sets of straps forming a flexible net of diamond pattern capable of contracting and expanding in girth to enclose cargoes of various girth dimension with corresponding extension and contraction of the vertical dimension of the net and corresponding changes in the angles of divergence of the two sets of straps relative to the connectors, all of said straps being in engagement with the arcuate edges of the connector apertures and being slideable along the arcuate edges to follow changes in angles of the straps.

10. Means to secure a cargo to a pallet, comprising:
a plurality of lower connectors spaced around the periphery of the pallet, each formed with at least one aperture with an arcuate edge;
a plurality of net segments encircling the cargo below the top of the cargo, each of said segments having connectors along both of its opposite side edges and along both of its upper and lower edges, each of said segments having two sets of oppositely inclined intersecting straps terminating at its connectors, said connectors on the edges of the segments having apertures with arcuate edges;
means releasably connecting said lower connectors on the pallet with the connectors along the lower edges of said segments;
means releasably interconnecting said segments by releasably interconnecting the connectors of the side edges of the segments; and
additional means extending across the top of the cargo and interconnecting the connectors on the top edges of the segments on opposite sides of the cargo, said additional means being adjustable to place said net segments under tension and to accommodate different cargo heights, said straps of the interconnected segments forming a flexible net of diamond pattern capable of contracting and expanding in girth to enclose cargoes of various girth dimension with corresponding extension and contraction of the vertical dimension of the net and corresponding changes in the angles of divergence of the two sets of straps relative to the connectors, all of said straps being in engagement with the arcuate edges of the connector apertures and being slideable along the arcuate edges to follow changes in angles of the straps.

References Cited by the Examiner

UNITED STATES PATENTS

| | | |
|---|---|---|
| 626,196 | 5/99 | Thompson. |
| 1,447,093 | 2/23 | Lee _____ 2—327 |
| 1,592,479 | 7/26 | Williams. |
| 2,477,432 | 7/49 | Walsh. |
| 2,521,326 | 9/50 | Bayon _____ 2—326 |
| 2,696,360 | 12/54 | Toffolon _____ 284—361 |
| 2,705,461 | 4/55 | Campbell _____ 294—77X |
| 2,764,762 | 10/56 | Grisanti _____ 2—338 |
| 2,771,315 | 11/56 | Fenwick _____ 294—74 |
| 2,867,406 | 1/59 | Davis _____ 248—361 |
| 3,018,811 | 1/62 | Deponai _____ 152—233 |

FOREIGN PATENTS

| | | |
|---|---|---|
| 477,864 | 8/15 | France. |
| 551,156 | 5/32 | Germany. |
| 612,702 | 5/35 | Germany. |
| 271,285 | 5/27 | Great Britain. |
| 80,919 | 4/16 | Switzerland. |

THERON E. CONDON, *Primary Examiner.*

FRANK L. ABBOTT, *Examiner.*